US006627080B2

(12) United States Patent
Oonishi et al.

(10) Patent No.: US 6,627,080 B2
(45) Date of Patent: Sep. 30, 2003

(54) FLAT MEMBRANE DISK

(75) Inventors: Makoto Oonishi, Chiyoda-ku (JP); Naoki Ohkuma, Chiyoda-ku (JP); Yutaka Okuno, Chiyoda-ku (JP); Yukio Murai, Chiyoda-ku (JP)

(73) Assignee: Hitachi Plant Engineering & Construction Co., Ltd., Tokyo (JP)

( * ) Notice: Subject to any disclaimer, the term of this patent is extended or adjusted under 35 U.S.C. 154(b) by 107 days.

(21) Appl. No.: 09/788,608

(22) Filed: Feb. 21, 2001

(65) Prior Publication Data
US 2001/0025814 A1 Oct. 4, 2001

(51) Int. Cl.[7] .................. B01D 63/16; B01D 63/08; B01D 65/00
(52) U.S. Cl. .............. 210/321.67; 210/321.68; 210/321.75; 210/321.84; 210/483
(58) Field of Search ................ 210/321.67, 321.68, 210/321.75, 321.76, 321.84, 321.85, 483

(56) References Cited

U.S. PATENT DOCUMENTS 4,876,007 A   10/1989  Naruo et al. ............. 210/339
5,275,725 A   1/1994   Ishii et al. ............... 210/321.67

FOREIGN PATENT DOCUMENTS

| DK | 158201 B | 6/1983 |
| EP | A2 0-513-796 | 11/1992 |
| GB | 1 552 957 | 9/1979 |
| JP | A 08-155279 | 6/1996 |
| JP | A 8-309160 | 11/1996 |
| JP | A 09-057072 | 3/1997 |
| JP | A 10-174849 | 6/1998 |

Primary Examiner—John Kim
(74) Attorney, Agent, or Firm—Oliff & Berridge, PLC

(57) ABSTRACT

The rotary flat membrane disk is constructed in which circular membranes are stretched at both sides of a disk. The disk and the membrane are bonded to each other over the entire periphery by a peripheral bonding part, and they are also bonded to each other by a plurality of partial bonding parts arranged inside the peripheral bonding part. The partial bonding parts are formed like dots of 10 mm in diameter, and are arranged at every 30 degrees on circles of 500 mm and 600 mm in diameter.

6 Claims, 8 Drawing Sheets

F I G. 1
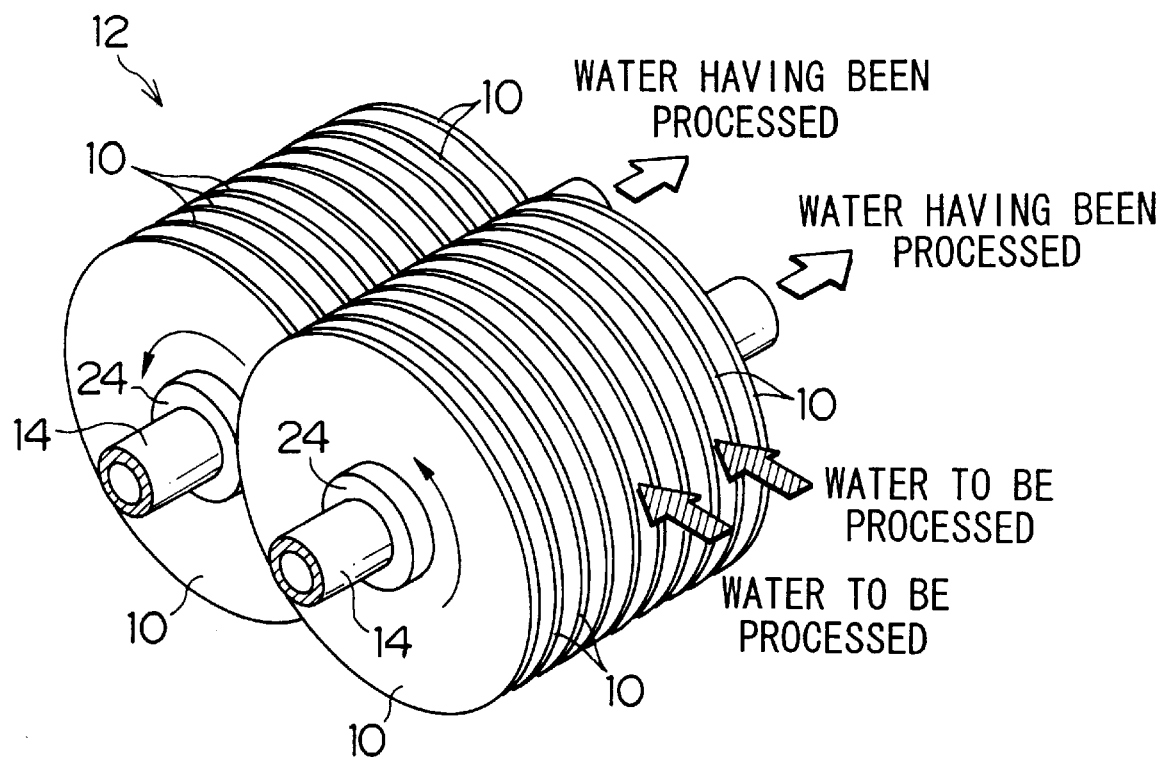

F I G. 4
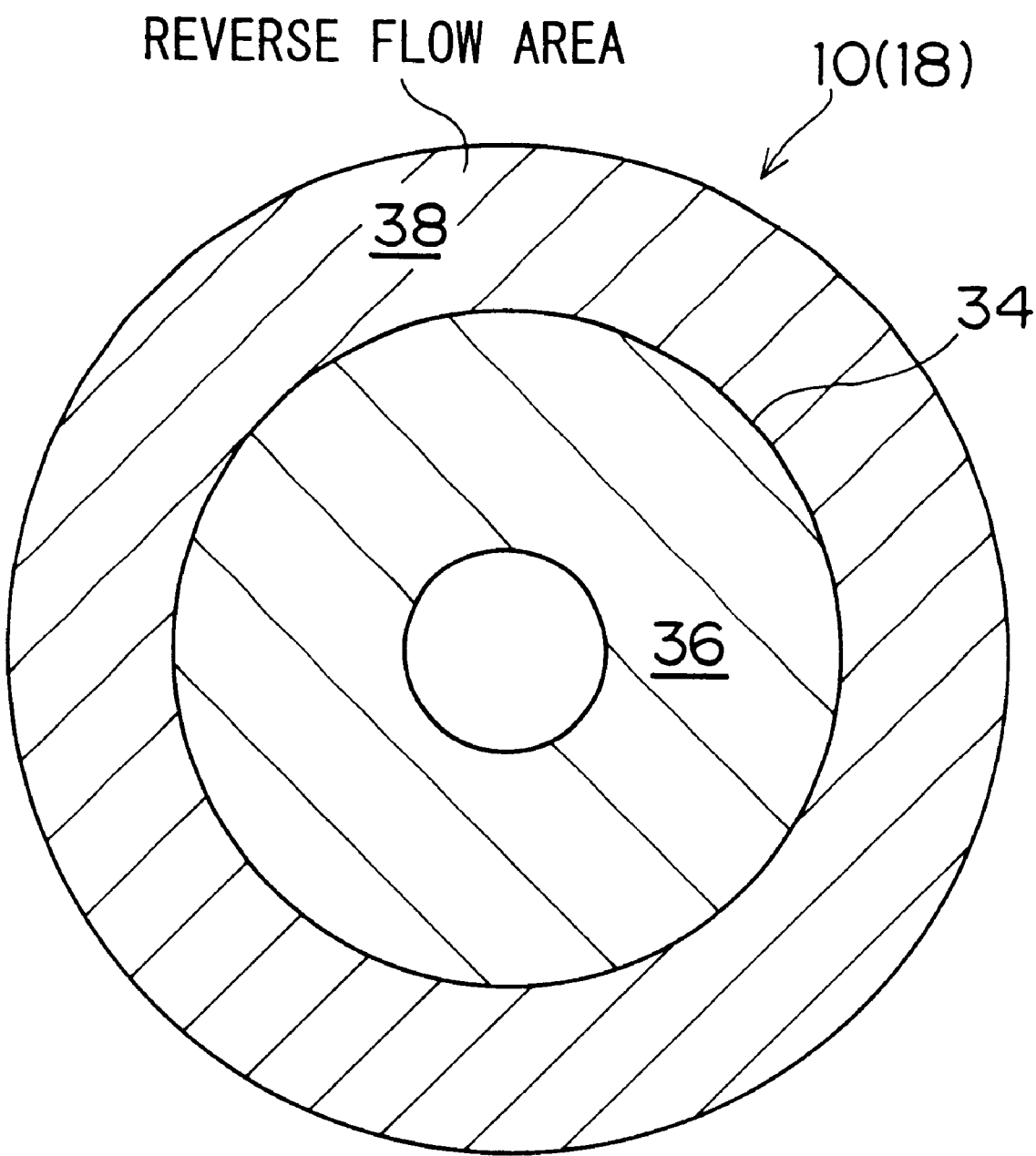

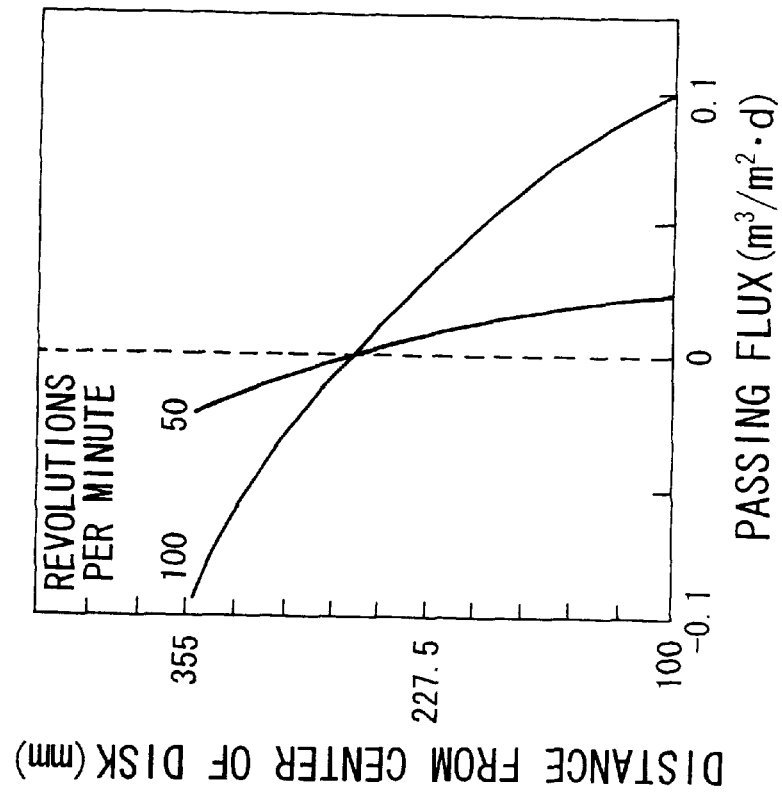
F I G. 5 (b)
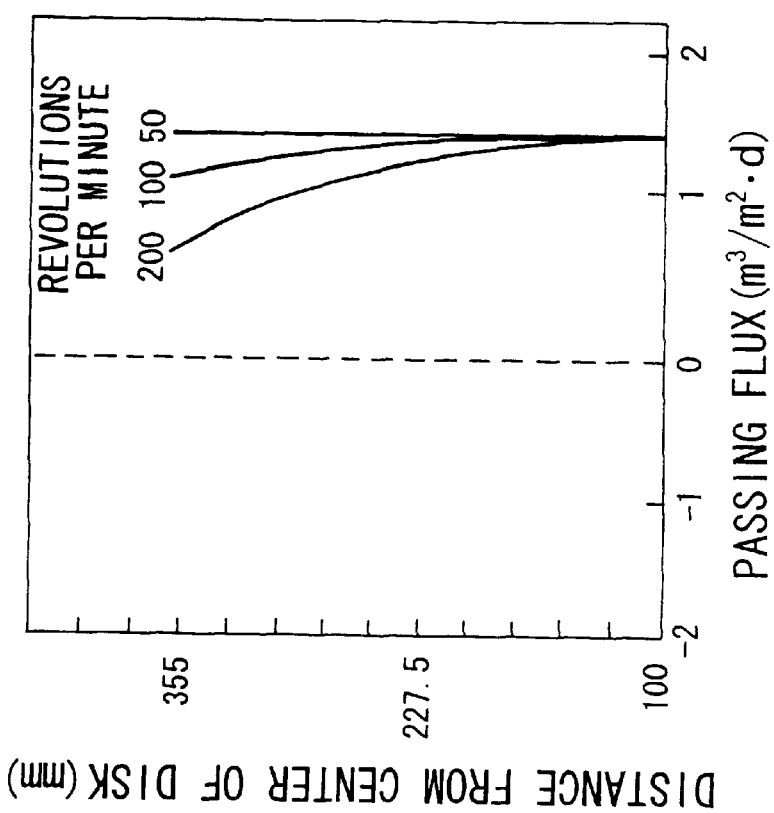
F I G. 5 (a)

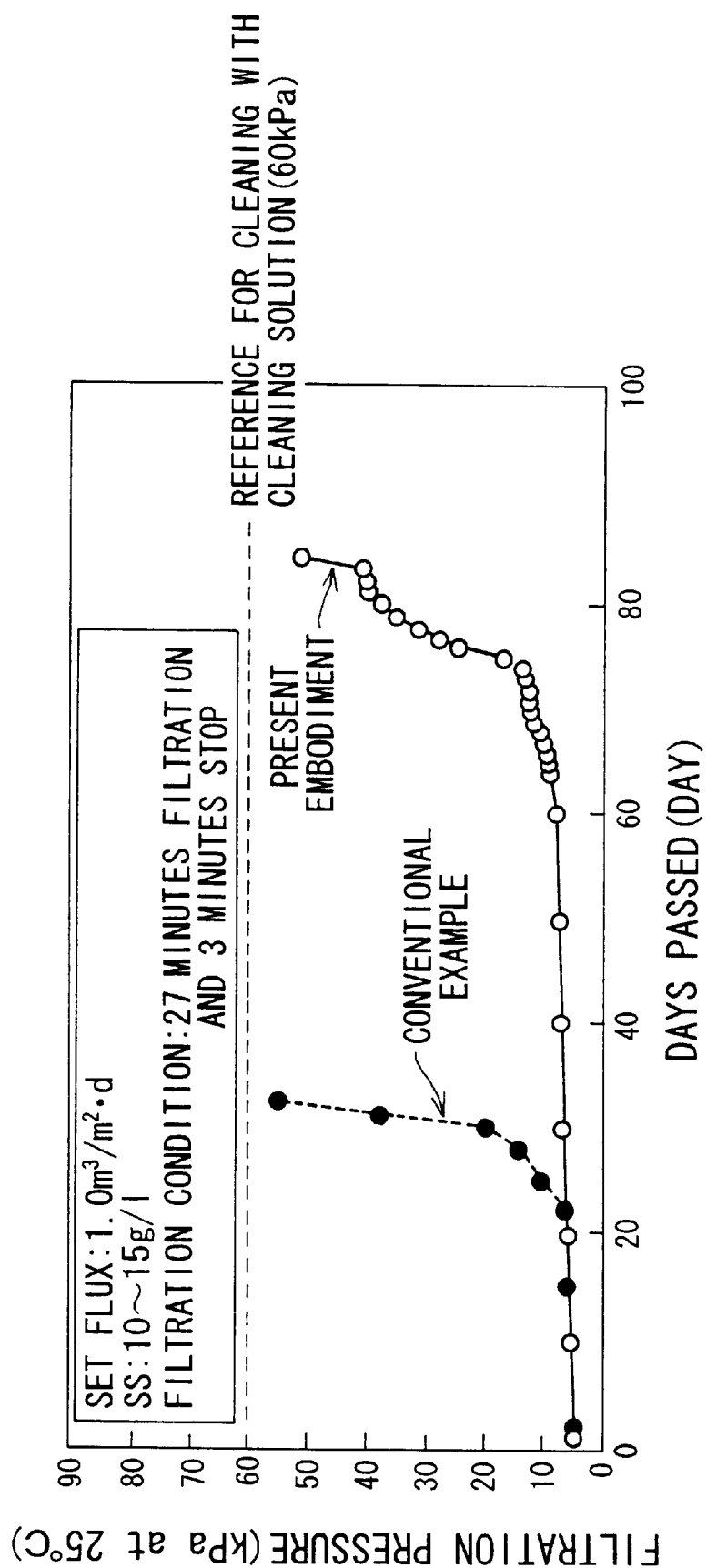
F I G. 6

F I G. 8
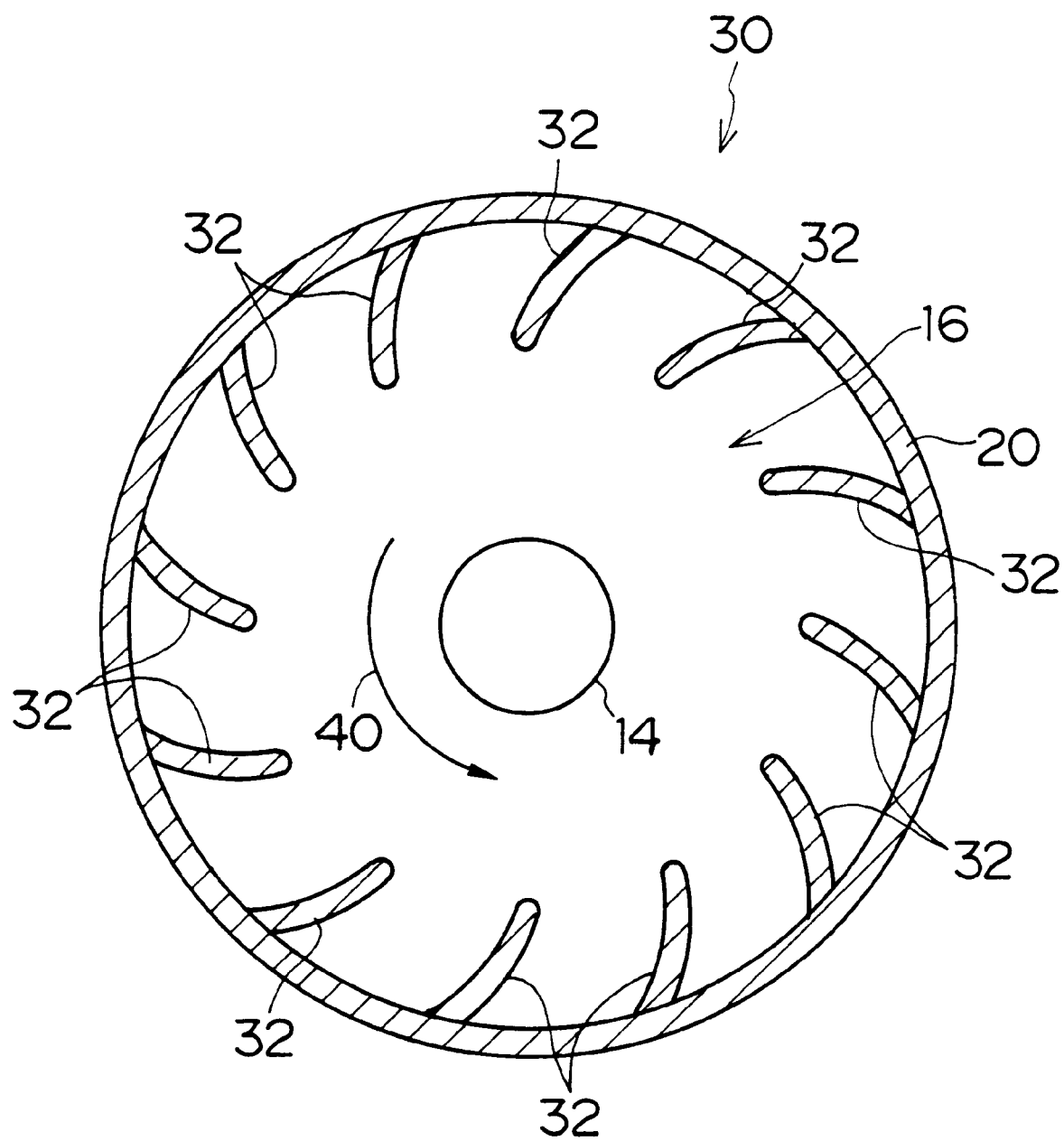

FLAT MEMBRANE DISK

BACKGROUND OF THE INVENTION

1. Field of the Invention

The present invention relates to a flat membrane disk, particularly to a flat membrane disk for a rotary flat membrane separation apparatus which performs filtration intermittently.

2. Description of Related Art

A rotary flat membrane separation apparatus comprises a hollow rotary shaft and many flat membrane disks mounted on the shaft. The rotary flat membrane separation apparatus performs filtration by rotating the flat membrane disks while drawing water to be processed into them. In each of the flat membrane disks, a flat membrane is stretched at each of sides of a disk-shaped support body, which is so-called a disk, and the flat membranes and the disk are bonded to each other all around the outer periphery. The flat membrane disks are always rotated with the rotary shaft, whereby providing the flat membrane surfaces a flux so as to prevent the membrane surfaces from being clogged. Thus, the rotary flat membrane separation apparatus can perform filtration with a low power, which differs from other apparatuses that provides a flux to the membrane surface by circulating the water to be processed.

An intermittent suction method in which the water to be processed is drawn and filtrated intermittently is applied to the rotary flat membrane separation apparatus, so that the filtration capacity of the flat membrane can be maintained. By this method, the suction of the water to be processed is temporarily stopped so as to lower the adhesion of the contamination onto the membrane surface while the flat membrane disks are continuously rotated so as to separate and eliminate the contamination layer from the membrane surface. Moreover, some of the filtrated water within the flat membrane disks is reversed through the flat membrane by the centrifugal force, so that reverse cleaning effect can be achieved.

However, the conventional rotary flat membrane separation apparatus had a problem in that the flat membrane is separated from the support body and swollen when the filtrated water is reversed. Because of the fact that the flat membrane is swollen over and over at every time the suction filtration is stopped, the flat membrane is stretched unduly and wrinkled, and consequently the flat membrane is broken.

SUMMARY OF THE INVENTION

The present invention has been developed in view of the above-described circumstances, and has as its object the provision of the flat membrane disk that can prevent the flat membrane from swelling.

In order to achieve the above-described object, the present invention is directed to a flat membrane disk for a rotary flat membrane separation apparatus, the disk comprising: a circular support body connected to a rotary shaft; and a circular flat membrane stretched at a side of the support body by bonding the membrane to the support body at an outer periphery of the membrane, the membrane being partially bonded to the support body with a bonding part.

According to the present invention, since the membrane is bonded to the support body by the additional bonding part in the area of the membrane nearer to the outer periphery of the membrane than the rotary shaft, the membrane is prevented from being separated and swollen. Therefore, wrinkles on the membrane are prevented and the breakage of the membrane can thus be prevented.

In the present invention, the additional bonding part is in a form of a line or a dot so that the area of the additional bonding part is small; thus, the filtration capability of the membrane is not deteriorated.

Moreover, in the present invention, the additional bonding part is arranged in an area where the fluid that has passed through the membrane to the inside of the flat membrane disk flows in a reverse direction through the membrane to the outside of the flat membrane disk; so that the swelling of the membrane can be effectively prevented.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a view showing an external appearance of a membrane module using a flat membrane disk in the present embodiment;

FIG. 4 is an explanatory view of a reverse flow area;

FIGS. 5(a) and 5(b) are views showing distributions of a passing flux with respect to a distance from the center of the disk;

FIG. 6 is a view showing filtration pressure through time;

FIG. 8 is a section view showing a flat membrane disk in still another embodiment.

DETAILED DESCRIPTION OF THE PREFERRED EMBODIMENT

Hereunder a preferred embodiment will be described in detail of the flat membrane disk of the present invention with the accompanied drawings.

FIG. 1 is a view showing an external appearance of a membrane module 12 to which a flat membrane disk 10 of the present embodiment is applied.

As seen from FIG. 1, the membrane module 12 comprises a rotary shaft 14 and a plurality of flat membrane disks 10, which are arranged on the rotary shaft 14 at regular intervals. The membrane module 12 is immersed in raw water (water to be processed) which is held in a process tank (not shown) of a rotary flat membrane separation apparatus. The rotary shaft 14 is connected with a drive unit (not shown), and can rotate together with the flat membrane disks 10. The rotary shaft 14 communicates with the inside of the flat membrane disks 10 as well as a suction unit (not shown), so that suction force can be generated inside the flat membrane disks 10 by driving the suction unit.

Figure 2:
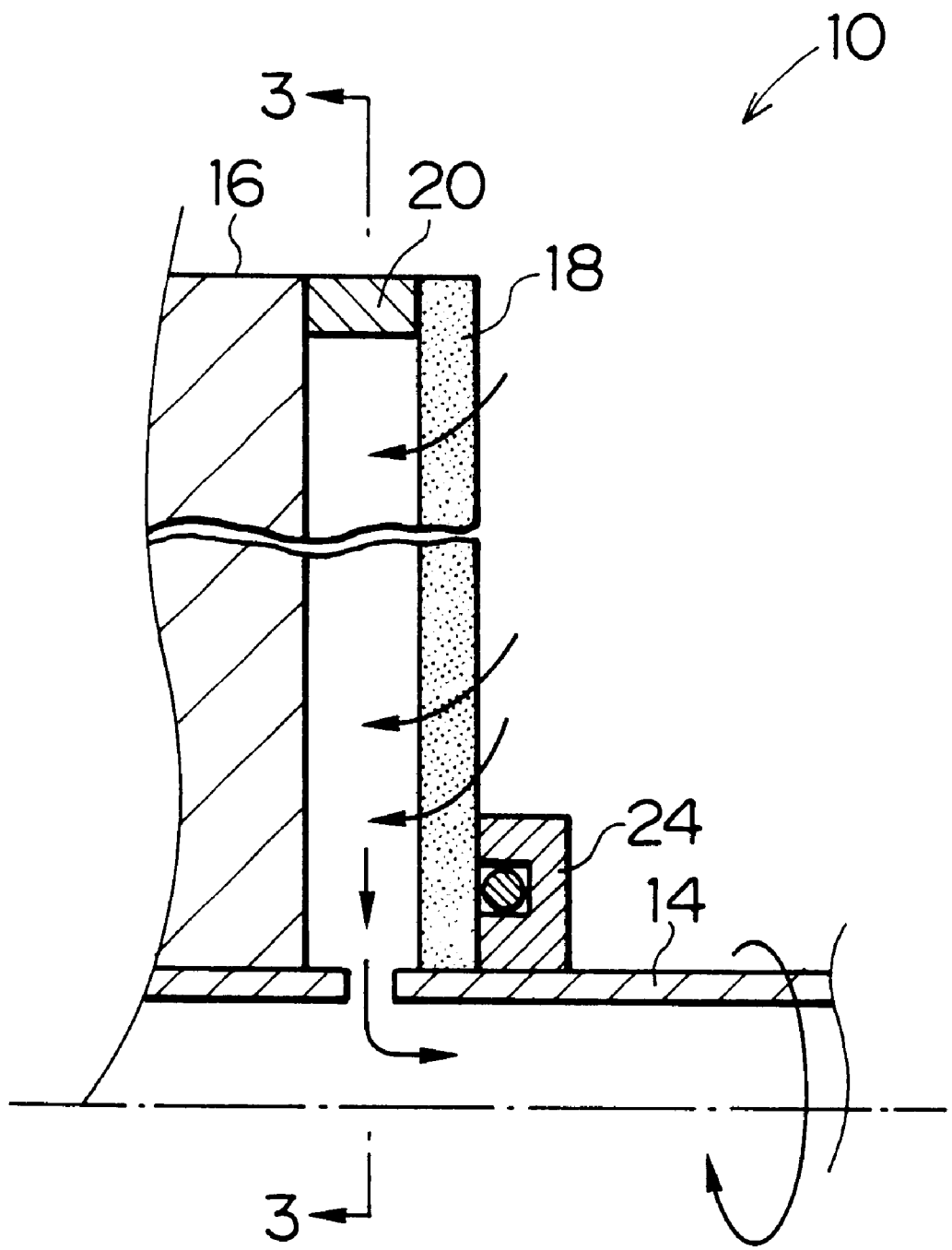
FIG. 2 is a side section view of the flat membrane disk in the present embodiment.
Figure 3:
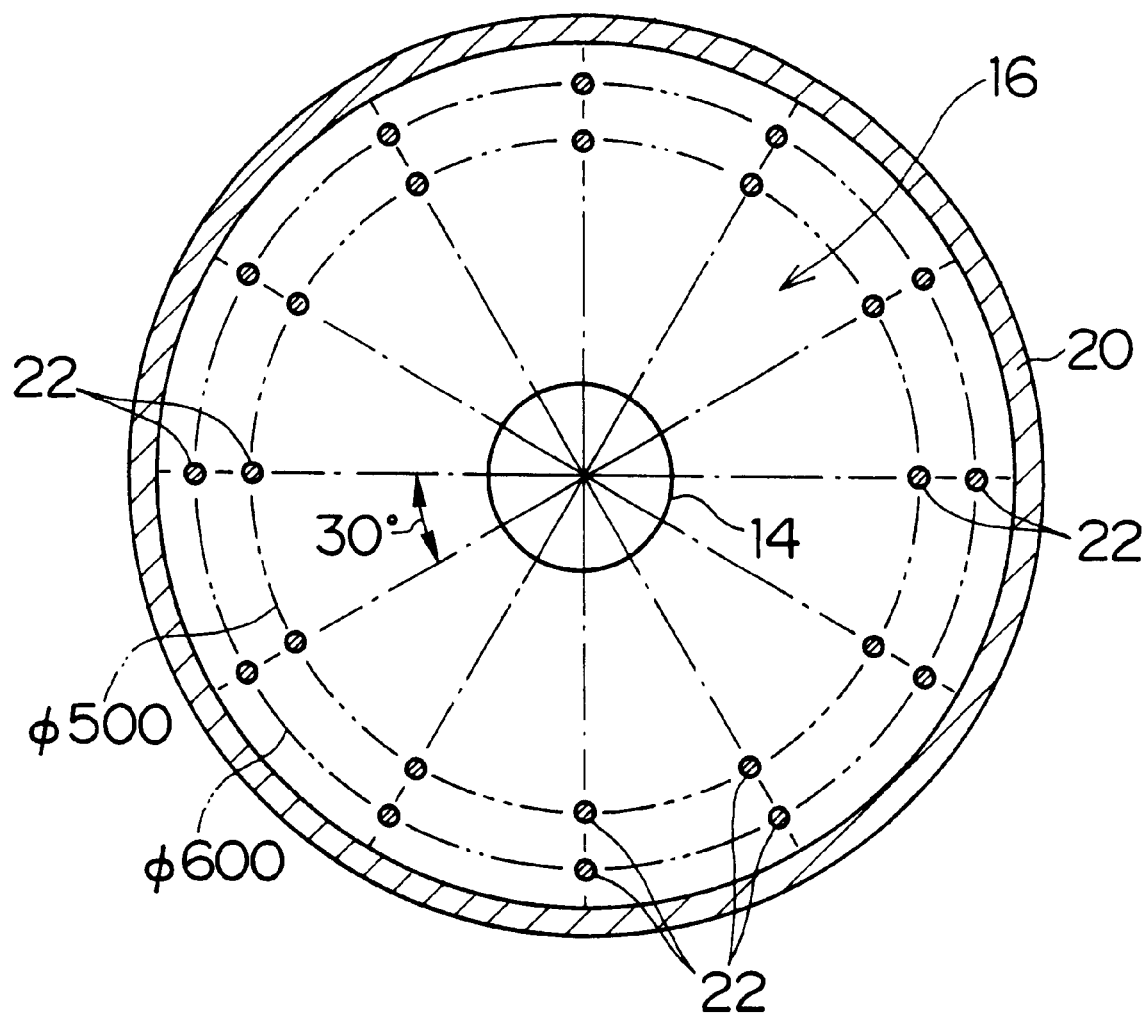
FIG. 3 is a section view along line 3—3 in FIG. 2.

FIG. 2 is a section view of the flat membrane disk 10, and FIG. 3 is a section view along line 3—3 in FIG. 2.

As seen from FIGS. 2 and 3, the flat membrane disk 10 comprises a circular disk 16 and circular flat membranes 18, each of which is attached to each of sides of the circular disk 16. The disk 16 and the flat membrane 18 are bonded all around the outer periphery, and the water that has been filtrated through the flat membrane 18 is not leaked to outside because of a bonding part 20 (hereunder called an outer periphery bonding part). Thus, as the suction force is generated inside the flat membrane disk 10 (between the disk 16 and the flat membrane 18), the raw water outside the flat membrane disk 10 is drawn into the inside of the flat membrane disk 10 through the flat membrane 18, and the filtrated water is transferred to the rotary shaft 14. A fluid sealing ring 24 prevents the filtrated water from being leaked around the rotary shaft 14.

As also seen from FIG. 3, a plurality of partial bonding parts 22 are provided to the flat membrane disk 10 between the rotary shaft and the outer periphery bonding part 20, but nearer to the outer periphery bonding part 20. Each of the partial bonding parts 22 securely bonds the flat membrane 18 and the disk 16 to each other in a small area. The partial bonding parts 22 are arranged in an area where the filtrated water flows in a reverse direction through the flat membrane 18 (the area is hereunder called a reverse flow area) at the time the suction-filtrating is stopped (that is, while the suction is stopped while continuing the rotation of the flat membrane disk 10). As seen from FIG. 4, the reverse flow area is normally formed outside a circular boundary 34 around the rotary shaft 14 of the flat membrane disk 10 when the flat membrane disk 10 is divided into two areally equal parts by the circular boundary 34. In other words, when the flat membrane disk 10 is divided so as to make the areas of a central part 36 and peripheral part 38 equal, the peripheral part 38 is the reverse flow area. For example, if the diameter of the flat membrane disk 10 is 700 mm and the width of the outer periphery bonding part 20 is 15 mm, the reverse flow area is formed outside the boundary 34 of the diameter about 500 mm. The partial bonding parts 22 are formed like dots with a diameter of 10 mm, and are arranged at every 30 degrees on circles of the diameters 500 mm and 600 mm. Thereby, the partial bonding parts 22 are uniformly arranged in the reverse flow area.

Next, an operation of the flat membrane disk 10 which is constructed as described above will be explained.

The membrane module 12 draws the raw water from the outside of the flat membrane disk 10 into the inside of the flat membrane disk 10 through the flat membrane 18 to filtrate the raw water by effecting the suction force inside the flat membrane disk 10. At that time, a contamination layer that cannot be eliminated despite rotating the flat membrane disk 10 gradually accumulates on the surface of the flat membrane 18. In order to eliminate such accumulation, the suction is temporally stopped after the suction-filtrating have been performed for a certain period of time, so as to decrease the suction pressure and adhesion of the contamination layer to the flat membrane 18, and at the same time the flat membrane disk 10 is continuously rotated to eliminate the contamination layer from the flat membrane 18. At that time, some of the filtrated water inside the flat membrane disk 10 flows in a reverse direction to the outside through the flat membrane 18.

FIGS. 5($a$) and 5($b$) show distribution of the flux passing through the flat membrane 18 of the flat membrane disk 10 with a diameter of 700 mm. FIG. 5($a$) shows the distribution during the filtration, and FIG. 5($b$) shows the distribution during suspension of the filtration. The direction of the flow from the outside to the inside of the flat membrane disk 10 is the positive direction. As seen from FIG. 5($a$), the passing flux is lowered from the center (i.e. the rotary shaft) to the extremity of the flat membrane disk 10 during the filtration. This is because the centrifugal force is applied to the filtrated water inside the flat membrane disk 10, and the filtrated water tends to flow in reverse so that the passing flux is difficult to obtain at the extremity of the flat membrane disk 10. However, the passing flux during the filtration receives almost no effect of the centrifugal force when the flat membrane disk 10 is normally rotated at 50 rpm, and the positive passing flux is always obtained even with the high-speed rotation at 200 rpm, and the reverse flow does not occur.

At the time of the filtration being stopped, on the other hand, as seen from FIG. 5($b$), the passing flux gradually decreases from the rotary shaft side to the extremity side, and the direction of the passing flux is reversed at a position about 250 mm from the center. In other words, the passing flux in the positive direction is always obtained in an area at the rotary shaft side outside a circle of 250 mm in radius around the center, and the area outside the 250 mm position is the reverse flow area where a flow in a direction that is reverse to the direction at the filtration is formed. Therefore, in a conventional flat membrane disk, the flat membrane is swollen out in the reverse area at every time the filtration is stopped, and the flat membrane might be wrinkled and broken.

In contrast, in the flat membrane disk 10 of the present embodiment, the flat membrane 18 is partially bonded to the disk 16 in the reverse flow area, and the flat membrane 18 is thereby prevented from swelling even though the reverse flow occurs. With regard to this swelling prevention effect of the flat membrane 18, the swelling of the flat membrane 18 can be decreased by about 40% in a simulation of the swelling of the flat membrane 18.

As described above, in the flat membrane disk 10 in the present embodiment, the flat membrane 18 is partially bonded to the disk 16 in the reverse flow area, so that the swelling of the flat membrane 18 can be prevented. Thus, wrinkles on the flat membrane 18 can be prevented and the life of the flat membrane 18 is improved.

In the flat membrane disk 10 in the present embodiment, the area of the bonding parts 22 is small since the bonding parts 22 are formed like dots; hence the filtration capacity of the flat membrane 18 of the flat membrane disk 10 is scarcely decreased. Thus, the swelling of the flat membrane 18 can be prevented without decreasing the filtration capacity of the flat membrane disk 10.

Moreover, in the flat membrane disk 10 in the present embodiment, the flat membrane 18 has increased number of binding points by providing the bonding parts 22 between the flat membrane 18 and the disk 16; hence the apparatus can operate with a more rotational speed of the flat membrane disk 10. More specifically, in a case where a conventional apparatus is operated at 40–60 rpm, the apparatus in the present embodiment can be operated at 80–100 rpm. Thereby, a large flux can be provided to the surface of the flat membrane 18, and the formation of the contamination layer on the flat membrane 18 can be effectively prevented. Thus, number of times for cleaning with cleaning solution can be decreased.

FIG. 6 shows a change of the filtration pressure of the flat membrane disk 10 through time, in which 27 minutes of filtration and 3 minutes suspension of the filtration are repeated under the condition that the set flux is 1.0 $m^3/m^2 \cdot day$ and Suspended Solids (SS) is 10–15 g/l. In a conventional example, of which data is indicated with a broken line in FIG. 6, the flat membranes 18 and the disk 16 have the same sizes as those of the present embodiment, and they are bonded to each other only at the outer periphery bonding part 20. The present embodiment shows the data where the flat membrane disk 10 is rotated at 80 rpm, whereas the conventional example shows the data where the flat membrane disk is rotated at 60 rpm.

As seen from FIG. 6, in the conventional example, the filtration pressure is dramatically risen after 20 days, and cleaning with cleaning solution is required about every 30 days; in contrast, the present embodiment can be continuously operated for about 90 days without cleaning.

Since the flat membrane disk in the conventional example has less number of binding points in the flat membrane 18 than that of the present embodiment, the flat membrane disk 10 can only be operated at 60 rpm. Because of that, the flux effecting on the surface of the flat membrane 18 is small, and the contamination layer cannot be effectively eliminated from the flat membrane 18. On the other hand, the flat membrane disk 10 of the present embodiment is provided with the partial bonding parts 22 and has more binding points on the flat membrane 18; hence, the flat disk 10 can be operated at 80 rpm, which is a high speed operation, and can effectively prevent adhesion of the contamination layer to the flat membrane 18.

According to the flat membrane disk 10 in the present embodiment, because the flat membrane disk 10 can be rotated at a higher rate than the conventional disk, the filtration capacity of the flat membrane 18 can be improved, and the necessity for cleaning the flat membrane 18 with the cleaning solution can be decreased.

Figure 7:
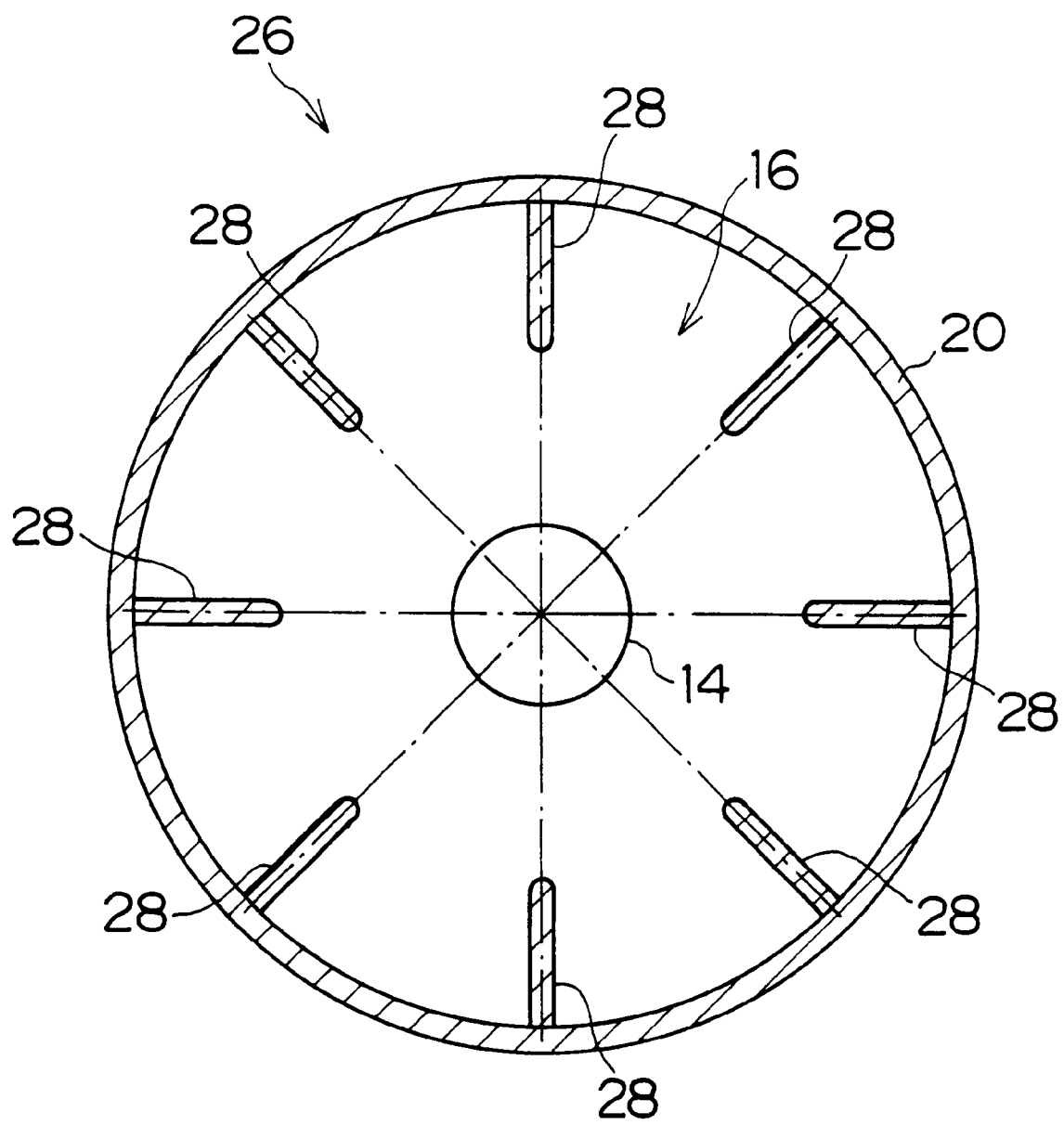
FIG. 7 is a section view showing a flat membrane disk in another embodiment.

In the above-described embodiment, the partial bonding parts 22 in dot shape are provided at every 30 degree on the circles of the diameters 500 mm and 600 mm; however, shapes and number of the partial bonding parts 22 are not restricted to the ones mentioned in the present embodiment. For example, each of partial bonding parts 28 of a flat membrane disk 26 in FIG. 7 is formed like a line, and is arranged in a direction of the diameter of the flat membrane disk 26. In such a case, the flat membrane 18 and the disk 16 are even more tightly bonded, and the swelling of the flat membrane 18 can be completely prevented.

Moreover, in a flat membrane disk 30 in FIG. 8, each of partial bonding parts 32 is arranged along a line of flow formed by the liquid inside the flat membrane disk 30 during the suspension of the filtration. In other words, the partial bonding parts 32 are inclined toward the rear side of a rotational direction 40 as they become closer to the outer periphery. Thus, the liquid inside the flat disk 30 flows along the partial bonding parts 32 during the suspension of the filtration, and the partial bonding parts 32 do not disturb the flow. Thus, the partial bonding parts 32 can be prevented from disturbing the rotation of the flat membrane disk 30, and the flat disk 30 can be operated at a high rate.

Form of the partial bonding part 22 can be a broken line, and the partial bonding parts 22 may be arranged as shown in FIGS. 7 and 8 so that the flat membrane 18 and the disk 16 can even more tightly bonded without increasing the area of the bonding parts 22.

The partial bonding parts 22 in the above-described embodiment are arranged in the reverse flow area, but the area to arrange them is not limited only to that.

The flat membrane 18 in the above-described embodiment is directly adhered to the disk 16; however, the adhesion can be through unwoven cloth and the like. The disk 16 may be constructed of a member permeable by water, so that liquid can go through the disk 16.

As described above, according to the flat membrane disk of the present invention, the flat membrane is partially bonded to the support body so as to prevent the flat membrane from separating from the support body and swelling; therefore, wrinkles on the flat membrane can be prevented from forming, and the breakage of the flat membrane can be prevented.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A flat membrane disk for a rotary flat membrane separation apparatus, the disk comprising:

a circular support body including a circular central part connected to a rotary shaft and a peripheral part surrounding the circular central part; and a circular flat membrane stretched at a side of the support body by bonding the membrane to the peripheral part of the support body all around an outer periphery of the membrane, the membrane being partially bonded to the support body with a bonding part at a plurality of locations in the peripheral part between the rotary shaft and the outer periphery of the membrane in a reverse flow area of the membrane where liquid having flowed through the membrane into an inner peripheral part of the flat membrane disk flows reversely to an outer peripheral part of the flat membrane disk.

2. The flat membrane disk as set forth in claim 1, wherein the bonding part is arranged as a series of radially spaced lines extending from a trailing end near the outer periphery of the membrane to a leading end oriented closer to the rotary shaft, each line being inclined so that the leading end extends towards a direction of flow of liquid flowing inside the flat membrane disk by rotation of the flat membrane disk.

3. The flat membrane disk as set forth in claim 2, wherein the lines are arcuate.

4. The flat membrane disk as set forth in claim 1, wherein the bonding part is arranged as a series of spaced, radially extending lines.

5. The flat membrane disk as set forth in claim 1, wherein the bonding part is arranged as a series of spaced small-area dots.

6. The flat membrane disk as set forth in claim 5, wherein the dots are radially aligned.

* * * * *